US011700581B2

(12) United States Patent
Regunathan et al.

(10) Patent No.: US 11,700,581 B2
(45) Date of Patent: Jul. 11, 2023

(54) TRANSMIT FREQUENCY BASED TERMINAL UPLINK POWER CONTROL IN A SATELLITE COMMUNICATION SYSTEM

(71) Applicant: HUGHES NETWORK SYSTEMS, LLC, Germantown, MD (US)

(72) Inventors: Murali Regunathan, Germantown, MD (US); George Eapen, Germantown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 16/450,543

(22) Filed: Jun. 24, 2019

(65) Prior Publication Data

US 2020/0351795 A1   Nov. 5, 2020

Related U.S. Application Data

(60) Provisional application No. 62/843,314, filed on May 3, 2019.

(51) Int. Cl.
| | |
|---|---|
| *H04W 52/24* | (2009.01) |
| *H04B 7/185* | (2006.01) |
| *H04W 52/14* | (2009.01) |
| *H04W 52/36* | (2009.01) |
| *H04W 72/044* | (2023.01) |

(Continued)

(52) U.S. Cl.
CPC ......... *H04W 52/243* (2013.01); *H04B 7/185* (2013.01); *H04W 52/146* (2013.01); *H04W 52/367* (2013.01); *H04W 72/0473* (2013.01); *H04W 72/541* (2023.01); *H04W 88/16* (2013.01)

(58) Field of Classification Search
CPC .................................................. H04B 7/18513
See application file for complete search history.

(56) References Cited

U.S. PATENT DOCUMENTS

| | | | | | |
|---|---|---|---|---|---|
| 4,896,369 | A | * | 1/1990 | Adams, Jr. ......... | H04B 7/18513 455/10 |
| 5,041,833 | A | * | 8/1991 | Weinberg ........... | H04B 7/18552 342/357.48 |

(Continued)

FOREIGN PATENT DOCUMENTS

| | | |
|---|---|---|
| WO | 2014016638 A1 | 1/2014 |

OTHER PUBLICATIONS

EP Communication issued in European Application No. 20172709,6. dated Oct. 6, 2020.

*Primary Examiner* — Khaled M Kassim
*Assistant Examiner* — Berhanu D Belete
(74) *Attorney, Agent, or Firm* — Potomac Technology Law, LLC

(57) ABSTRACT

Methods and apparatus are disclosed for uplink power control of a terminal in a satellite communication system. Calibration data that includes output backoff values corresponding to input backoff values for each of a first set of calibration frequencies is initially stored in the terminal. A normalized transmit power for the terminal is determined for multiple transmit frequencies based on the calibration data. Upon receiving an assigned frequency for communicating, the terminal selects one of the normalized transmit power previously determined and begins transmitting.

20 Claims, 10 Drawing Sheets

(51) Int. Cl.
*H04W 72/541* (2023.01)
*H04W 88/16* (2009.01)

(56) References Cited

U.S. PATENT DOCUMENTS

| | | | | |
|---|---|---|---|---|
| 6,157,812 | A * | 12/2000 | Sarraf | H04B 7/18515 370/316 |
| 6,205,172 | B1 * | 3/2001 | Makinen | H04B 17/20 375/227 |
| 6,314,294 | B1 * | 11/2001 | Benveniste | H04W 52/50 455/452.2 |
| 6,442,397 | B1 * | 8/2002 | Benveniste | H04W 16/10 455/522 |
| 6,473,623 | B1 * | 10/2002 | Benveniste | H04W 52/30 455/69 |
| 9,673,917 | B2 * | 6/2017 | Conroy | H04B 17/21 |
| 9,730,227 | B2 * | 8/2017 | Marsh | H04B 7/18539 |
| 10,153,831 | B1 * | 12/2018 | Gokhale | H04B 7/18563 |
| 2002/0098847 | A1 * | 7/2002 | Benveniste | H04W 16/10 455/452.2 |
| 2003/0040274 | A1 * | 2/2003 | Dai | H04B 7/18543 455/13.4 |
| 2003/0064745 | A1 * | 4/2003 | Benveniste | H04W 24/00 455/69 |
| 2003/0086486 | A1 * | 5/2003 | Graziano | H04L 25/4975 375/222 |
| 2003/0149991 | A1 * | 8/2003 | Reidhead | H04N 7/17309 725/127 |
| 2005/0020205 | A1 * | 1/2005 | Khoini-Poorfard | H03C 3/40 455/23 |
| 2005/0020217 | A1 * | 1/2005 | Khoini-Poorfard | H03F 1/34 455/127.1 |
| 2005/0271127 | A1 * | 12/2005 | Cassiers | H04B 3/32 375/219 |
| 2006/0014496 | A1 * | 1/2006 | Klein | H04W 16/14 455/63.1 |
| 2007/0206525 | A1 * | 9/2007 | Miller | H04L 1/0011 370/321 |
| 2008/0096489 | A1 * | 4/2008 | He | H04B 1/28 455/75 |
| 2008/0291982 | A1 * | 11/2008 | Kirby | G01S 19/21 342/357.59 |
| 2009/0191910 | A1 * | 7/2009 | Athalye | H04W 52/246 455/522 |
| 2009/0298422 | A1 * | 12/2009 | Conroy | H04B 17/21 455/12.1 |
| 2010/0216407 | A1 * | 8/2010 | Gormley | H04B 17/104 455/67.11 |
| 2011/0007646 | A1 * | 1/2011 | Miller | H04B 7/18513 370/252 |
| 2011/0007647 | A1 * | 1/2011 | Miller | H04B 7/18543 370/252 |
| 2011/0009055 | A1 * | 1/2011 | Miller | H04B 7/18513 455/13.4 |
| 2011/0141938 | A1 * | 6/2011 | Miller | H04L 1/0011 370/252 |
| 2013/0012830 | A1 * | 1/2013 | Leininger | A61B 5/02055 600/546 |
| 2013/0065544 | A1 * | 3/2013 | Kelton | H04W 52/241 455/114.2 |
| 2015/0126133 | A1 * | 5/2015 | Wang | H04B 17/12 455/67.16 |
| 2015/0261275 | A1 * | 9/2015 | Wolcott | H04L 41/12 713/310 |
| 2015/0270891 | A1 * | 9/2015 | Re | H04W 52/146 455/13.4 |
| 2016/0036471 | A1 * | 2/2016 | Subrahmaniyan Radhakrishnan | H03F 1/3241 375/296 |
| 2016/0045150 | A1 * | 2/2016 | Leininger | A61B 5/02055 600/546 |
| 2016/0128069 | A1 * | 5/2016 | Bodduru | H04L 43/0823 370/252 |
| 2016/0278063 | A1 * | 9/2016 | Zhang | H04W 72/046 |
| 2016/0302207 | A1 * | 10/2016 | Vasavada | H04W 52/50 |
| 2016/0381644 | A1 * | 12/2016 | Forrester | H04W 72/21 370/311 |
| 2017/0065218 | A1 * | 3/2017 | Leininger | A61B 5/7271 |
| 2017/0118721 | A1 * | 4/2017 | Miller | H04W 52/146 |
| 2017/0134103 | A1 * | 5/2017 | Tessandori | H04B 7/18519 |
| 2017/0188322 | A1 * | 6/2017 | Calmettes | G01S 5/0231 |
| 2017/0273038 | A1 * | 9/2017 | Peitzer | H04W 52/52 |
| 2017/0280460 | A1 * | 9/2017 | Emmanuel | H04W 28/0236 |
| 2018/0192380 | A1 * | 7/2018 | Peitzer | H04W 52/242 |
| 2018/0198584 | A1 * | 7/2018 | Sanderovich | H04L 27/26132 |
| 2019/0007126 | A1 | 1/2019 | Regunathan et al. | |
| 2019/0059060 | A1 * | 2/2019 | Chen | H03F 1/3241 |
| 2020/0068493 | A1 * | 2/2020 | Ding | H04W 52/325 |

\* cited by examiner

TRANSMIT FREQUENCY BASED TERMINAL UPLINK POWER CONTROL IN A SATELLITE COMMUNICATION SYSTEM

CROSS-REFERENCE TO RELATED APPLICATION

The present application claims priority to U.S. Provisional Patent Application No. 62/843,314 filed May 3, 2019, and entitled "TRANSMIT FREQUENCY BASED TERMINAL UPLINK POWER CONTROL IN A SATELLITE COMMUNICATION SYSTEM", the entire disclosure of which is incorporated herein by reference.

BACKGROUND INFORMATION

High throughput satellite (HTS) systems are used to provide voice and data access in areas that may lack cellular or landline infrastructure. HTS systems typically employ multiple gateways (or satellite hubs) to provide service to customers utilizing very small aperture terminals (VSATs, or simply "terminals). Gateways can assign frequencies to terminals, such that terminals can transmit data to the gateway (and receive data from the gateway) using the assigned transmit frequencies. Generally, an output power of the terminal can vary significantly as a function of frequency, which can result in higher packet error rates for data transmissions from the terminal to the gateway. Further, when a terminal is assigned a new transmit frequency and transmits a burst of data at the same power as the previously assigned transmit frequency, the transmit power and correspondingly the received signal to noise ratio (SNR) at the gateway can vary from a desired SNR value. If the received SNR is lower than a desired or threshold value, various errors can result at the gateway due to data loss. If the SNR is higher than a desired value, performance degradation can occur in the satellite system due to adjacent channel interference (ACI). A constant received SNR is therefore required to achieve a constant packet error rate at the gateway.

Terminals typically monitor and control output power depending on conditions such as atmospheric precipitation, frequency variations, symbol rate, etc. In order to compensate for rain fade, for example, transmit power can be dynamically adjusted based on the rain fade estimation. Closed loop power control functions can be implemented to adjust power output over gradual frequency changes, in an attempt to maintain a constant SNR with changing channel conditions. The channel conditions change slowly enough due to rain and other atmospheric conditions such that a feedback from the gateway can be used to control the terminal power. As the terminal transmit power is varied over frequency changes, however, higher packet error rates can result on the return inroute (to the satellite).

Based on the foregoing, there is a need for an approach which allows the terminal to transmit with relatively the same power output regardless of changes in frequency so that the SNR at the gateway remains substantially constant.

BRIEF SUMMARY

Methods and apparatus are disclosed for uplink power control of a terminal in a satellite communication system. According to an embodiment, the method includes: storing calibration data in a terminal, the calibration data comprising output backoff values corresponding to input backoff values for each of a first set of calibration frequencies; determining a normalized transmit power of the terminal for one or more transmit frequencies within a predetermined frequency range based, at least in part, on the calibration data; receiving an assigned frequency for use by the terminal to communicate with a gateway in a satellite communication system; selecting a normalized transmit power corresponding to the assigned frequency; and transmitting uplink data from the terminal to the gateway using the normalized transmit power.

According to another embodiment, the method includes obtaining calibration data for a terminal during a calibration procedure, wherein the calibration data comprises output backoff values corresponding to input backoff values for each of a first set of calibration frequencies, and a first set of gain values associated with each of a second set of frequencies; determining a normalized transmit power of the terminal for one or more transmit frequencies, based on the calibration data; receiving an assigned frequency for communicating with a gateway in a satellite communication system; and transmitting data to the gateway using a selected normalized transmit power corresponding to the assigned frequency.

The foregoing summary is only intended to provide a brief introduction to selected features that are described in greater detail below in the detailed description. As such, this summary is not intended to identify, represent, or highlight features believed to be key or essential to the claimed subject matter. Furthermore, this summary is not intended to be used as an aid in determining the scope of the claimed subject matter.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DETAILED DESCRIPTION

Figure 1:
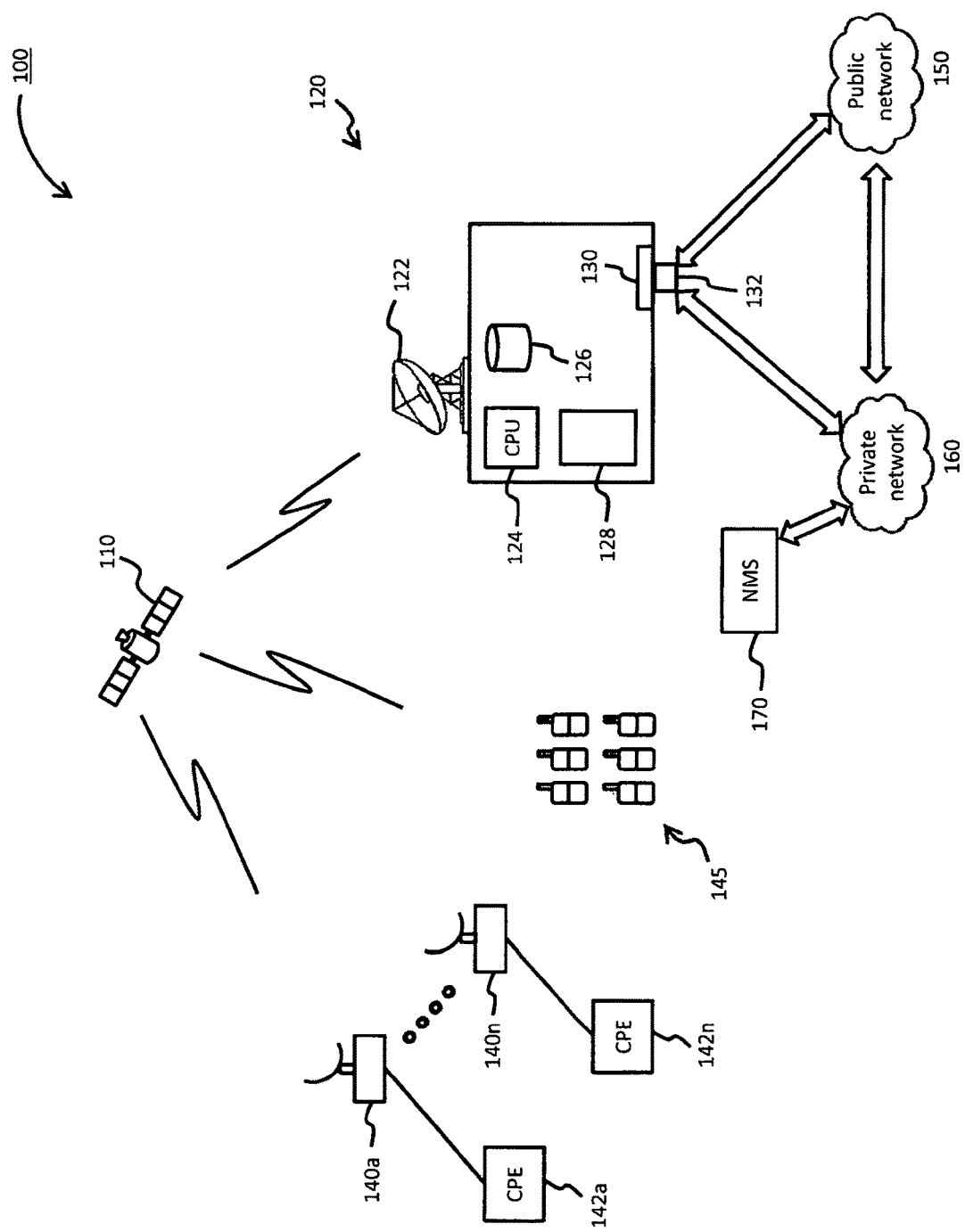
FIG. 1 is a diagram of a system capable of providing voice and data communication, according to one or more embodiments.

Methods and systems are described herein for uplink power control of a terminal in a satellite communication system. In the following description, for purposes of explanation, numerous specific details are set forth in order to provide a thorough understanding of the disclosed embodiments. It will become apparent, however, to one skilled in the art that various embodiments may be practiced without these specific details or with an equivalent arrangement. In other instances, well-known structures and devices are shown in block diagram form in order to avoid unnecessarily obscuring the various embodiments.

A method as described herein for uplink power control comprises determining a normalized transmit power of a terminal in a satellite communication system based on calibration data stored in the terminal. The calibration data is acquired during a calibration procedure that is performed, for example, during manufacture of the terminal. For example, a newly manufactured terminal comprises a radio that can be calibrated at the factory prior to being deployed within a satellite communication system. Although calibration is performed during the manufacturing process, the terminal can be calibrated or re-calibrated at any time. In either case, the calibration data can include one or more output backoff values corresponding to input backoff values for each of a first set of calibration frequencies.

For example, the first set of calibration frequencies can include several calibration frequencies that span a range of frequencies at which the radio of the terminal is capable of operating. The terms "radio of the terminal", "radio", and "terminal" are used interchangeably to describe combination of hardware and software components which perform transmit and receive operations to and from the satellite. Further, for each calibration frequency, a range of input backoff values is defined, and a corresponding range of output backoff values is measured for each input backoff value within the range. For example, input backoff values may include a set of ascending input backoff values ranging from 0 dB/m to 20 dB/m in increments of 1, 2, 3, 4, 5, etc. dB/m. For each defined input backoff value, an output backoff value is measured.

For example, the radio may be preset with a defined input backoff value. A signal is transmitted using the defined input backoff value, and an output value of the signal is measured to provide the corresponding output backoff value. Thus, a plurality of input backoff values and corresponding output backoff values are obtained for each calibration frequency. Given storage space and time of measurement considerations, a limited number of calibration frequencies may be used. For example, 6, 7, 8, etc. calibration frequencies can be used, with the lowest calibration frequency being near the lowest frequency at which the radio is capable of transmitting, and the highest calibration frequency being near the highest frequency at which the radio is capable of transmitting. This information can be tabulated and subsequently stored within a memory, or an associated storage device, of the terminal using various formats and/or data structures such as tables, arrays, linked list, etc.

The calibration data can also include radio gain values associated with each of a second set of frequencies. These values comprise the transmit power for each frequency when the radio of the terminal is configured at a default set point. The default set point can correspond, for example, to a lowest input backoff value that meets one or more required thresholds of the satellite communication network, such as a maximum adjacent channel interference (ACI) threshold, or an error vector measure (EVM) threshold. Depending on the specific configuration, the lowest input backoff value can correspond to a highest possible transmission power value that meets the ACI and/or the EVM thresholds. Thus the gain values associated with each of the second set of frequencies include a maximum possible transmit value for each frequency in the second set of frequencies that the radio can use without exceeding the ACI and/or the EVM threshold. These gain values can also be measured during the factory calibration procedure, along with the default set point. Further, the frequencies in the second set of calibration frequencies, while being different from the first set of calibration frequencies, also span the range of frequencies at which the radio of the terminal is capable of operating.

For example, the frequencies can be selected at intervals starting at the lowest capable frequency of the radio to the highest capable frequency of the radio. As discussed in greater detail with respect go FIG. 3, the calibration data can be stored in a table that contains gain values for the second set of calibration frequencies. Similarly, the output backoff values corresponding to the input backoff values can be based on the default set point and stored in a table. As previously discussed, the measurement of the output backoff values for each input backoff value is performed while the radio is configured at the default set point. The input backoff values are calibrated to the default set point, and the output backoff values are measured for each input backoff value. Thus, in exemplary embodiments further described below, the terminal can normalize a transmit power for an assigned transmit frequency based on these values.

The assigned transmit frequency can be any frequency within a predefined frequency range for the terminal. The terminal can be configured to determine the predefined frequency range based on various factors such as its location within the satellite communication network, a type of data being transmitted, and so on. The predefined frequency range may be a portion of the range of frequencies that the radio can utilize, as well as the specific frequency spectrum assigned to, or owned by, the satellite communication system. The frequency spectrum is divided and reused, as appropriate, within the spot beams supported by the satellite communication system. For example, while the radio is capable of transmission using a frequency range of approximately 750 MHz, the predefined frequency range can be 50 MHz, 100 MHz, 200 MHz, 300 MHz, etc. More particularly, the predefined frequency range can be a portion of a frequency spectrum allocated to a coverage beam within which the terminal is located. Further, the predefined frequency range can be received from various sources including the gateway, a network management system (NMS), etc. The gateway (or gateways) can determine and manage specific frequency assignments for terminals within their responsible spot beams. Each terminal must, therefore, be capable of operating within the entire frequency spectrum.

For example, when the terminal is switched on and registered with the gateway, it is configured to receive a set of potential frequency assignments from the gateway. The frequency assignment can include, for example, a pair of frequencies to be used by the terminal for uplink (transmit) and downlink (receive) communication to/from the gateway. Thus, the gateway is configured to assign a set of transmit frequencies to the terminal, subsequent to which the terminal can transmit data to the gateway. Further, the terminal can be configured to determine a normalized transmit power for multiple transmit frequencies based on the calibration data. For example, determining the normalized transmit power can include matching the transmit frequencies (received from the gateway) with the first and second sets of calibration frequencies, and determining a plurality of output backoff values corresponding to input backoff values. Upon receiving an assigned transmit frequency from the gateway, the terminal selects the closest frequency from a lookup table, for example, and determines the normalized transmit power corresponding to the frequency. The terminal would subsequently transmit data using the normalized transmit power for the assigned transmit frequency.

The terminal can be configured, for example, to determine the normalized transmit power by generating a first subset (S1) of frequencies based on matching a minimum transmit frequency and a maximum transmit frequency of the one or more transmit frequencies to the first set of calibration frequencies. For example, a lowest frequency from the received transmit frequencies is matched with a frequency from the first set of calibration frequencies. The matched frequency (from the first set of calibration frequencies) may be greater or lesser in value than the lowest transmit frequency being matched. If two calibration frequencies are equally close to the lowest transmit frequency, then the lower frequency of the two calibration frequencies is matched to the lowest transmit frequency. Similarly, the highest (i.e. maximum) frequency from the transmit frequencies is matched with a calibration frequency (from the first set of calibration frequencies). The first subset (S1) then contains both matched calibration frequencies, and all the calibration frequencies from the first set of calibration frequencies that are in between the matched calibration frequencies. A second subset (S2) of frequencies is subsequently generated based on matching the minimum transmit frequency and the maximum transmit frequency to the second set of calibration frequencies. Identical operations are therefore performed using the minimum and maximum transmit frequencies as described above with respect to the first subset (S1), except that these operations are performed with respect to the second subset (S2). Thus, the two subsets (S1) and (S2) contain different numbers of frequencies that are approximately within the same range.

Next, a first subset of gain values (G) associated with each of the second subset of frequencies (S2) can be obtained from the first set of gain values associated with the second set of calibration frequencies. As previously discussed, the calibration data includes gain values measured at a default set point for each frequency in the second set of calibration frequencies. Thus, this operation includes generating a list (G) of gain values corresponding to the frequency values in subset (S2). The second subset of frequencies (S2) is then interpolated to obtain a third subset (S2r) of frequencies, and the first subset of gain values (G) is interpolated to obtain a second subset (Gr) of gain values. Such interpolation can be used to provide a higher resolution by increasing the number of gain values relative to the number of measured gain values. It should be noted that any method of interpolation such as spline interpolation, power exponent interpolation, etc. can be used. Furthermore, interpolation can be performed at a midpoint between any two adjacent values. The distance between two adjacent values may be subdivided (e.g., into thirds, quarters, etc.) in order to obtain more values. Thus, the interpolated gain values correspond to the interpolated frequency values. These values can subsequently be added to a lookup table or other data structure.

Upon generating the interpolated set of gain values (Gr) associated with the third subset of frequencies (S2r), a minimum gain value of the second subset of gain values (Gr) is selected, and a third subset of gain values (Gd) is determined by calculating a difference between the minimum gain value and each gain value of the second subset of gain values (Gr). Alternatively, a maximum value can be selected and the third subset (Gd) determined by calculating a difference between said maximum gain value and each gain value in the second subset (G2). The differences between the two embodiments will be further described below. In either case, output backoff values corresponding to input backoff values are identified and a closest matching frequency is obtained from the first subset of frequencies (S1) for each frequency band in the third subset of frequencies (S2r). Each gain value of the third subset of gain values (Gd) is combined with (or added to) a corresponding output backoff value associated therewith. The combined values are subsequently stored in the lookup table along with the third subset of frequencies. Thus, the lookup table would define an association between each input backoff value and a sum of the corresponding output backoff value and the associated gain value for a plurality of frequencies. For example, the lookup table can include input backoff values at specific resolutions (e.g., 0.05 dB, 0.1 dB, 0.2 dB, etc.) and corresponding output backoff values. The terminal then selects the normalized transmit power for an assigned transmit frequency by referring to the lookup table.

As described above, the third subset of gain values Gd (from which the lookup table is generated) can be generated using either a minimum gain value from the second subset of gain values (G2) is used to calculate the differences, or a maximum gain value. Using the minimum value can ensure that the normalized transmit power used is the same for all assigned transmit frequencies (based on the lookup table) and helps in not exceeding noise thresholds at the gateway receiving the signal, such as signal-to-noise ratio (SNR) thresholds. On the other hand, using the maximum gain value can increase the normalized transmit power for each assigned transmit frequency, such that the radio of the terminal transmits at a higher efficiency.

Depending on the specific implementation, the lookup table can be transmitted from the terminal to the gateway, and the gateway can be configured to determine which frequency and gain values from the lookup table should be assigned to the terminal. For example, the gateway may be configured to correlate the frequency and corresponding gain values from the lookup table with known symbol rates, coding rates, and modulation schemes corresponding to the frequencies, and to identify combinations of symbol rates, coding rates, and modulation schemes that would satisfy different SNR requirements. Therefore, the gateway would only assign frequencies that meet the SNR requirements for certain symbol rates, coding rates, and/or modulation schemes to the terminal. For example, the gateway can be configured to calculate which frequency the terminal can operate at for a given symbol rate and modulation, and assign higher symbol rate or a higher order modulation scheme to the frequencies with higher setpoint gain and the lower symbol rate or a lower order modulation assigned to frequencies with lower setpoint gain (with the higher or lower setpoint gain being based on the calibration data). Further, in the event that the power frequency response information (i.e., gain values corresponding to the second set of frequencies at the default set point) is generally consistent across the radios of various terminals deployed in the satellite communication network, the gateway may use that information to determine assignment of the higher symbol rates or higher order modulation to correspond with the higher setpoint gain frequencies and correspondingly the lower symbol rates with the lower setpoint gain frequencies.

Subsequent to normalization using either method described above, the lookup may be performed for different transmit frequencies or assigned frequencies as received from the gateway. For example, the method can further include receiving, from the gateway, a second assigned transmit frequency, and transmitting data to the gateway using a second normalized transmit power corresponding to the second assigned transmit frequency. The second normalized transmit power is selected from the lookup table in an entry corresponding to the second assigned transmit frequency. Thus, interpolated backoff values in the lookup table can be used by the terminal in real time to transmit data using different transmit frequency assignments at the appropriate normalized power levels for each different transmit frequency assignment.

Rather normalizing the transmit power based on a default set point as described above, a different set point may be determined for different calibration frequencies. For example, during the calibration procedure, a set point may be determined for another set of frequencies that span the range of frequencies at which the radio of the terminal is capable of operating. Thus, the calibration data for different configurations can further include a set point value for each additional set of calibration frequencies. Such set point values would include a lowest input backoff value (or a highest power value) that meets a maximum ACI threshold and/or EVM threshold. The normalized transmit power could then be determined by matching a transmit frequency (as received from, for example, the gateway) to the first set of calibration frequencies described above, to determine corresponding output backoff values. The normalized transmit power would be determined by matching the transmit frequency to the additional set of calibration frequencies to determine a corresponding set point value, and then adjusting the set point value for each subsequent transmission. For each assigned transmit frequency, the corresponding set point value would therefore be set prior to transmission of data using that assigned transmit frequency. Thus, the lookup table would include the output backoff values corresponding to input backoff values for a first set of calibration frequencies, as well as the set points for another (e.g. second) set of calibration frequencies.

FIG. 1 illustrates a satellite communication system 100 capable of providing voice and data services. The satellite communication system 100 includes a satellite 110 that supports communications among a number of gateways 120 (only one shown) and multiple stationary satellite terminals 140a-140n. Each stationary satellite terminal (or terminal) 140 can be configured for relaying traffic between its customer premise equipment (CPEs) 142a-142n, a public network 150 such as the internet, and/or its private network 160. According to an exemplary embodiment, the terminals 140 can be in the form of very small aperture terminals (VSATs) that are mounted on a structure, habitat, etc. The terminals 140 therefore remain in the same location once mounted. As illustrated in FIG. 1, the satellite communication system 100 can also include a plurality of mobile terminals 145 that are capable of being transported to different locations by a user. The gateway 120 can be configured to route this traffic across the public network 150 and private network 160 as appropriate. The gateway 120 can be further configured to route traffic from the public Internet 150 and private network 160 across the satellite link to the appropriate terminal 140. The terminal 140 then routes the traffic to the appropriate customer premise equipment (CPE) 142.

According to at least one embodiment, the gateway 120 can include various components, implemented in hardware, software, or a combination thereof, to facilitate communication between the terminals 140, 145 and external networks 150, 160 via the satellite 110. According to an embodiment, the gateway 120 can include a radio frequency transceiver 122 (RFT), a processing unit 124 (or computer, CPU, etc.), and a data storage unit 126 (or storage unit). As used herein, a transceiver corresponds to any type of antenna unit used to transmit and receive signals, transmitter, receiver, etc. useable to transmit and receive signals within a communication system such as the instant satellite communication system 100. The data storage unit 126 can be used, for example, to store and provide access to information pertaining to operations in the satellite communication system 100. According to other embodiments, the gateway 120 can include multiple processing units 124 and multiple data storage units 126 in order to accommodate the needs of a particular system implementation. The data storage unit 126 (or storage unit) can be configured, for example, as a single drive, multiple drives, an array of drives configured to operate as a single drive, etc. Although not illustrated in FIG. 1, the gateway 120 can also include one or more workstations 125 (e.g., computers, laptops, etc.) in place of, or in addition to, the one or more processing units 124. Various embodiments further provide for redundant paths for components of the gateway 120. The redundant paths are associated with backup components capable of being seamlessly or quickly switched in the event of a failure or critical fault of the primary component.

According to the illustrated embodiment, the gateway 120 includes baseband components 128 which operate to process signals being transmitted to, and received from, the satellite 110. For example, the baseband components 128 can incorporate one or more modulator/demodulator units, system timing equipment, switching devices, etc. The modulator/demodulator units are used to generate carriers that are transmitted into each spot beam and to process signals received from the terminals 140, 145. The system timing equipment can be used to distribute timing information for synchronizing transmissions from the terminals 140, 145. The satellite communication system 100 also includes a network management system 170 (NMS) that maintains, in part, information (configuration, processing, management, etc.) for the gateway 120 and all terminals 140, 145 and beams supported by the gateway 120. The gateway 120 can further include a network interface 130, such as one or more edge routers, for establish connections with a terrestrial connection point 132 from a service provider. Depending on the specific implementation, however, multiple terrestrial connection points 132 may be utilized.

Figure 2:
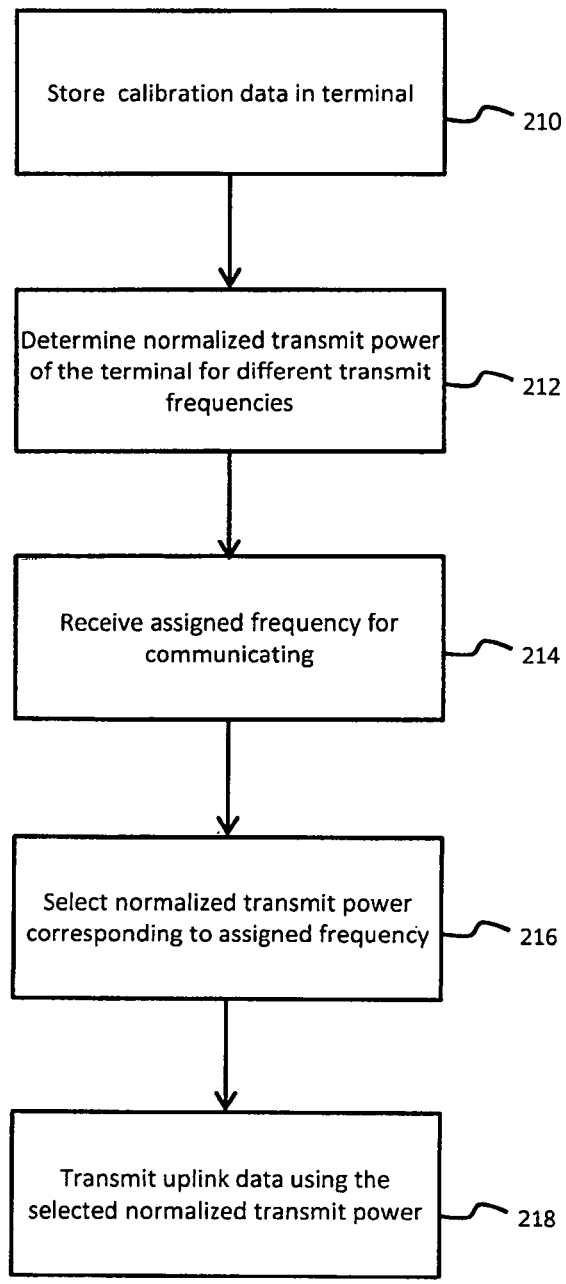
FIG. 2 is a flowchart of a process for performing uplink power control based on a transmit frequency of a terminal, according to one or more embodiments.

FIG. 2 is a flowchart of a process for performing uplink power control based on a transmit frequency of a terminal, according to one or more embodiments. At 210, calibration data is stored in the terminal. The calibration data may be acquired, for example, during a calibration procedure as further described below with reference to FIG. 3. The calibration data can include one or more output backoff values corresponding to input backoff values for each of a first set of calibration frequencies. For example, the first set of calibration frequencies can include several calibration frequencies that span a predefined frequency range at which the radio of the terminal is capable of operating. Further, for each calibration frequency, a range of input backoff values is defined, and a corresponding range of output backoff values is measured for each input backoff value within the range.

According to an embodiment, the calibration data can also include radio gain values associated with each of a second set of frequencies. These values can include, for example, the transmit power for each frequency when the radio of the terminal is configured at a default set point. The default set point corresponds to a lowest input backoff value that meets one or more required thresholds of the satellite communication network, such as a maximum adjacent channel interference (ACI) threshold, or an error vector measure (EVM) threshold. In other words, the lowest input backoff value corresponds to a highest possible transmission power value that meets the ACI and/or the EVM thresholds. Thus the gain values associated with each of the second set of frequencies includes a maximum possible transmit value for each frequency in the second set of frequencies that the radio can use without exceeding the ACI and/or the EVM threshold. These gain values can also be measured during the factory calibration procedure, along with the default set point. Further, the frequencies in the second set of calibration frequencies, while being different from the first set of calibration frequencies, also span the range of frequencies at which the radio of the terminal is capable of operating.

At 212, a normalized transmit power of the terminal is determined for the one or more transmit frequencies based on the calibration data. For example, determining the normalized transmit power can include comparing the transmit frequencies (received from the gateway) with the first and second sets of calibration frequencies. Subsequently, a lookup table can be generated based on the comparison, as further described below with reference to FIGS. 3-7. According to various embodiments, the normalized transmit powers are determined for only a subset of transmit frequencies (e.g., the one or more transmit frequencies), rather than all frequencies at which the radio (or terminal) is capable of operating. Such embodiments can advantageously reduce the time required for startup and operation of the terminal. For example, the terminal can be powered up, receive potential frequency assignments (i.e. the predefined range of transmit frequencies) from the gateway, and determine normalized transmit powers for only those transmit frequencies to save time and energy. If the terminal subsequently receives a different range of transmit frequencies, normalized transmit powers would only be determined for the different range of frequencies. Since the calibration data includes calibration values for the entire frequency range of the radio, the terminal can at any time determine normalized transmit power values for different ranges of transmit frequencies.

At 214, the terminal receives a frequency assignment for data transmission. According to an embodiment, the frequency assignment can be received from the gateway. The frequency assignment can be in the form of a transmit/receive frequencies to be used by the terminal. Thus, the transmit frequency would be used to transmit uplink data to the gateway via the satellite, and the receive frequency would be used to receive downlink data from the gateway. At 216, the terminal selects the normalized transmit power for the assigned frequency. This can include looking up a backoff value for the assigned frequency from the lookup table, and applying the backoff value to the transmit power at the assigned frequency.

At 218, the terminal transmits data to the gateway using the normalized transmit power corresponding to the assigned frequency. Thus, the terminal is able to transmit with approximately the same (i.e. normalized) transmit power from its radio, regardless of which transmit frequency is assigned thereto. Further, subsequent to normalization using either of the methods described above, the lookup 216 and transmission 218 may be performed for different transmit frequencies or assigned frequencies as received from the gateway. For example, a second assigned frequency can be received from the gateway, and the terminal can use a second normalized transmit power corresponding to the second assigned frequency to transmit the uplink data. The second normalized transmit power is selected from the lookup table in an entry corresponding to the second assigned frequency. Thus, the calibration data can be used by the terminal in real time to transmit data using different frequency assignments at the appropriate normalized power levels for each different frequency assignment.

Figure 3:
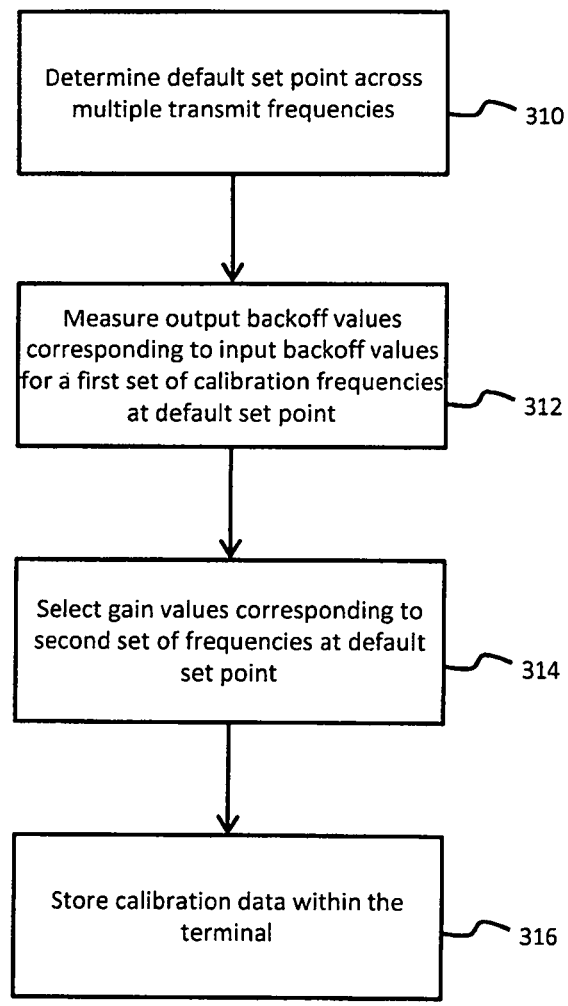
FIG. 3 is a flowchart of a process for obtaining calibration data for a terminal, according to one or more embodiments.

FIG. 3 is a flowchart of a process for obtaining calibration data for a terminal, according to one or more embodiments. The calibration data is acquired during a calibration procedure that is performed, for example, during manufacture of the terminal. For example, a newly manufactured terminal includes a radio that can be calibrated at the factory prior to being deployed within a satellite communication system. In other embodiments, the terminal can be calibrated or re-calibrated at any time. At 310, a default set point of the terminal is determined. The default set point can correspond, for example, to a lowest input backoff value that meets one or more required thresholds of the satellite communication network, such as a maximum ACI or EVM threshold. More particularly, the lowest input backoff value corresponds to a highest possible transmission power value that meets the ACI and/or the EVM thresholds. For example, determining the default set point can include measuring an output gain for a plurality of frequencies, measuring the ACI and EVM, and determining the lowest input backoff value that meets ACI and EVM thresholds across the plurality of frequencies. The lowest input backoff value is set as the default set point, and any subsequent adjustment to the input backoff value may be performed relative to the default set point. The plurality of frequencies may be selected from a range of frequencies at which the radio in the terminal is capable of operating.

At 312, one or more output backoff values corresponding to input backoff values are measured for each of a first set of calibration frequencies. According to an embodiment, the first set of calibration frequencies can include several calibration frequencies that span the range of frequencies at which the radio of the terminal is capable of operating. For example, several frequencies at increments between a lowest frequency of the radio and a highest frequency of the radio can be selected and, for each specific calibration frequency, a range of input backoff values is defined. Next, a corresponding range of output backoff values is measured for each input backoff value within the range. According to one or more embodiments, input backoff values can include a set of ascending input backoff values ranging from 0 dBm to 20 dBm in increments of 1, 2, 3, 4, 5, etc. dBm. For each defined input backoff value, an output backoff value is measured.

For example, the radio may be preset with a defined input backoff value, a signal is transmitted, and an output value of the signal is measured to provide the corresponding output backoff value. Thus, a plurality of input backoff values and corresponding output backoff values are obtained for each calibration frequency. Given storage space and time of measurement considerations, a limited number of calibration frequencies may be used. For example, 6, 7, 8, etc. calibration frequencies can be used, with the lowest calibration frequency being near the lowest frequency at which the radio is capable of transmitting, and the highest calibration frequency being near the highest frequency at which the radio is capable of transmitting. According to at least one embodiment, calibration frequencies within the first set can include: 29250 MHz, 294000 MHz, 29650 MHz, 29800 MHz, 29900 MHz, and 30000 MHz. According to other embodiments, this information can be tabulated and stored within a memory or storage device of the terminal.

TABLE 1

| Frequency | Power | Output Backoff Values per Input Backoff | | | | | | | | | | |
|---|---|---|---|---|---|---|---|---|---|---|---|---|
| (MHz) | at 0 dB | 1 | 2 | 3 | 4 | 5 | 6 | 7 | 10 | 13 | 15 | 17 | 20 |
| 29250 | 3009 | 6 | 11 | 18 | 27 | 35 | 44 | 53 | 80 | 113 | 132 | 151 | 181 |
| 29400 | 3162 | 4 | 8 | 12 | 19 | 26 | 34 | 42 | 69 | 102 | 122 | 143 | 172 |
| 29650 | 2980 | 6 | 11 | 19 | 26 | 35 | 44 | 53 | 80 | 112 | 132 | 152 | 180 |
| 29800 | 3074 | 3 | 7 | 13 | 20 | 28 | 36 | 45 | 73 | 105 | 124 | 146 | 175 |
| 29900 | 3166 | 4 | 8 | 12 | 19 | 27 | 34 | 43 | 71 | 105 | 123 | 144 | 174 |
| 30000 | 3073 | 5 | 10 | 17 | 24 | 32 | 41 | 51 | 79 | 111 | 130 | 150 | 179 |

Table 1 illustrates exemplary output backoff values that can be used in one or more embodiments. As depicted in Table 1, each of the six calibration frequencies is associated with a transmit power at 0 dB of input attenuation. For example, for a calibration frequency of 29250 MHz, a transmit power (i.e., output power) at 0 dB of input attenuation (i.e. input backoff) is 30.09 dB. Further, for an input backoff of 1 dB, the value 6 indicates that the output power is reduced by 0.6 dB (i.e., the corresponding output backoff is 0.6 dB); thus the output power would be 29.49 dB. Similarly, for an input backoff of 2 dB, the value 11 indicates that the output power is reduced by 1.1 dB (i.e., the corresponding output backoff is 1.1 dB); thus the output power would be 28.99 dB. This calculation can be applied for each calibration frequency at each input backoff level. For example, given a calibration frequency of 30000 MHz and an input backoff of 20 dB, the output backoff would be 17.9 dB. Thus, the output power would be 17.9 dB subtracted from 30.73 dB (i.e. the output power at 0 dB input backoff), resulting in 12.83 dB. Further, as described above, these output backoff values are measured with the radio configured to use a default set point.

At 316, gain values corresponding to the second set of frequencies at the default set point are selected. These values can include the transmit power for each frequency when the radio of the terminal is configured at the default set point. More particularly, the gain values associated with each of the second set of frequencies would include a maximum possible transmit value for each frequency in the second set of frequencies that the radio can use without exceeding the ACI and/or the EVM threshold. These gain values can also be measured during the factory calibration procedure, along with the default set point. Further, the frequencies in the second set of calibration frequencies, while being different from the first set of calibration frequencies, also span the range of frequencies at which the radio in the terminal is capable of operating. For example, the frequencies can be selected at intervals starting with the lowest possible frequency of the radio to the highest possible frequency of the radio. Table 2 below shows exemplary calibration data that includes gain values for the second set of calibration frequencies.

TABLE 2

| Frequency | Gain |
|---|---|
| PFR1 | 2914 |
| PFR2 | 2948 |
| PFR3 | 3043 |
| PFR4 | 3062 |
| PFR5 | 3112 |
| PFR6 | 3046 |
| PFR7 | 2989 |
| PFR8 | 2930 |
| PFR9 | 2876 |
| PFR10 | 2921 |

TABLE 2-continued

| Frequency | Gain |
|---|---|
| PFR11 | 2979 |
| PFR12 | 3022 |
| PFR13 | 3084 |
| PFR14 | 3176 |
| PFR15 | 3123 |
| PFR16 | 3102 |

As depicted in Table 2, the transmit power frequency response is recorded in 50 MHz steps with 16 points over a 750 MHz range. Each value is in 100s of dBm, so a value of 2914 is 29.14 dBm. Further, according to at least one embodiment, the output backoff values corresponding to the input backoff values (as presented above for example with reference to Table 1) can be based on the default set point. More particularly, the measurement of the output backoff values for each input backoff value is performed while the radio is configured at the default set point. The input backoff values are calibrated to the default set point, and the output backoff values are measured for each input backoff value. At 318, the calibration information is stored in a memory or storage device of the terminal. Thus, the terminal would be able to determine normalized transmit power for an assigned frequency based on these values.

Figure 4A:
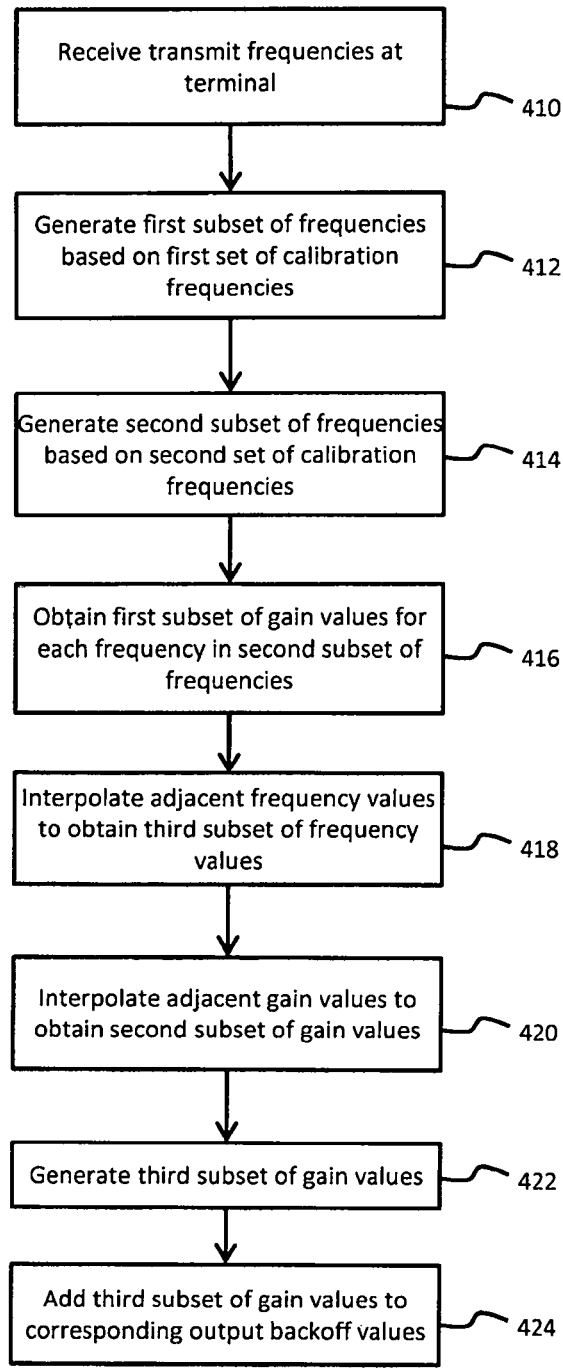
FIG. 4A is a flowchart of a process for determining a normalized transmit power based, in part, on a minimum interpolated gain value, according to one or more embodiments.

FIG. 4A is a flowchart of a process for determining a normalized transmit power, according to one or more embodiments. At 410, a predefined (or network-defined) range of transmit frequencies is received from a gateway. The transmit frequencies can include, for example, center frequencies of various bands for a coverage beam within which the terminal is assigned or located. Further, the range of transmit frequencies may span the whole usable frequency range of the various frequency bands in a user beam. At 412, a first subset of frequencies (hereinafter referred to as S1) is generated based on matching a minimum transmit frequency and a maximum transmit frequency of the one or more transmit frequencies to the first set of calibration frequencies. For example, a lowest frequency from the received transmit frequencies is matched with a frequency from the first set of calibration frequencies. The matched frequency (from the first set of calibration frequencies) may be greater or lesser in value than the lowest transmit frequency being matched.

According to at least one embodiment, if two calibration frequencies are equally close to the lowest transmit frequency, then the lower of the two calibration frequencies is matched to the lowest transmit frequency. Similarly, the highest (i.e. maximum) frequency from the transmit frequencies is matched with a calibration frequency (from the first set of calibration frequencies). The first subset (S1) then contains both matched calibration frequencies, and all the calibration frequencies from the first set of calibration frequencies that are between the matched calibration frequencies. Further at 414, a second subset (S2) of frequencies is generated based on matching the minimum transmit frequency and the maximum transmit frequency to the second set of calibration frequencies. Thus, the two subsets (S1) and (S2) contain different numbers of frequencies that are approximately within the same range.

At 416, a first subset of gain values (hereinafter referred to as G) associated with each of the second subset of frequencies S2 is obtained from the first set of gain values associated with the second set of calibration frequencies. As previously discussed, the calibration data includes gain values measured at a default set point for each frequency in the second set of calibration frequencies. Thus, the operation at 416 includes generating a list of gain values corresponding to the frequency values in subset S2. At 418, the second subset of frequencies S2 is interpolated to obtain a third subset of frequencies (hereinafter referred to as S2r). At 420, the first subset of gain values G is interpolated to obtain a second subset of gain values (hereinafter referred to as Gr). Such interpolation can be used to provide a higher resolution by increasing the number of gain values relative to the number of measured gain values. It should be noted that any method of interpolation such as spline interpolation, power exponent interpolation, etc. can be used. According to an embodiment, the interpolation is performed exactly mid-distance between any two frequency points. According to further embodiments, additional subdivisions may be used to improve the resolution.

At 422, a third subset of gain values (hereinafter referred to as Gd) is determined. According to one or more embodiments, a minimum gain value of the second subset of gain values Gr is obtained. The third subset of gain values (hereinafter referred to as Gd) is subsequently determined by calculating a difference between the minimum gain value and each gain value of the second subset of gain values Gr. At 424, each gain value from the third subset of gain values is added to a corresponding output backoff value. According to one or more embodiments, output backoff values corresponding to input backoff values can be identified for each frequency band in the third subset of frequencies (S2r), and a closest matching frequency is obtained from the first subset of frequencies (S1). Each gain value of the third subset of gain values (Gd) is then added to a corresponding associated output backoff value. According to various embodiments, the resulting values can be stored within the terminal in order to eliminate the need calculate each time a change in frequency assignment occurs. According to one implementation, for example, each frequency from the interpolated set of frequencies can be stored in a first dimension (e.g., column) of lookup table. The corresponding sum of output backoff values and gain values can be stored in a second dimension (e.g., row) of the table. Thus, upon identifying a particular frequency in a column of the lookup table, the corresponding sum of output values and gain values can be quickly retrieved added thereto, corresponding to each frequency from the interpolated set of frequencies. During operation, the terminal can select the normalized transmit power for an assigned transmit frequency by referring to the lookup table.

Figure 4B:
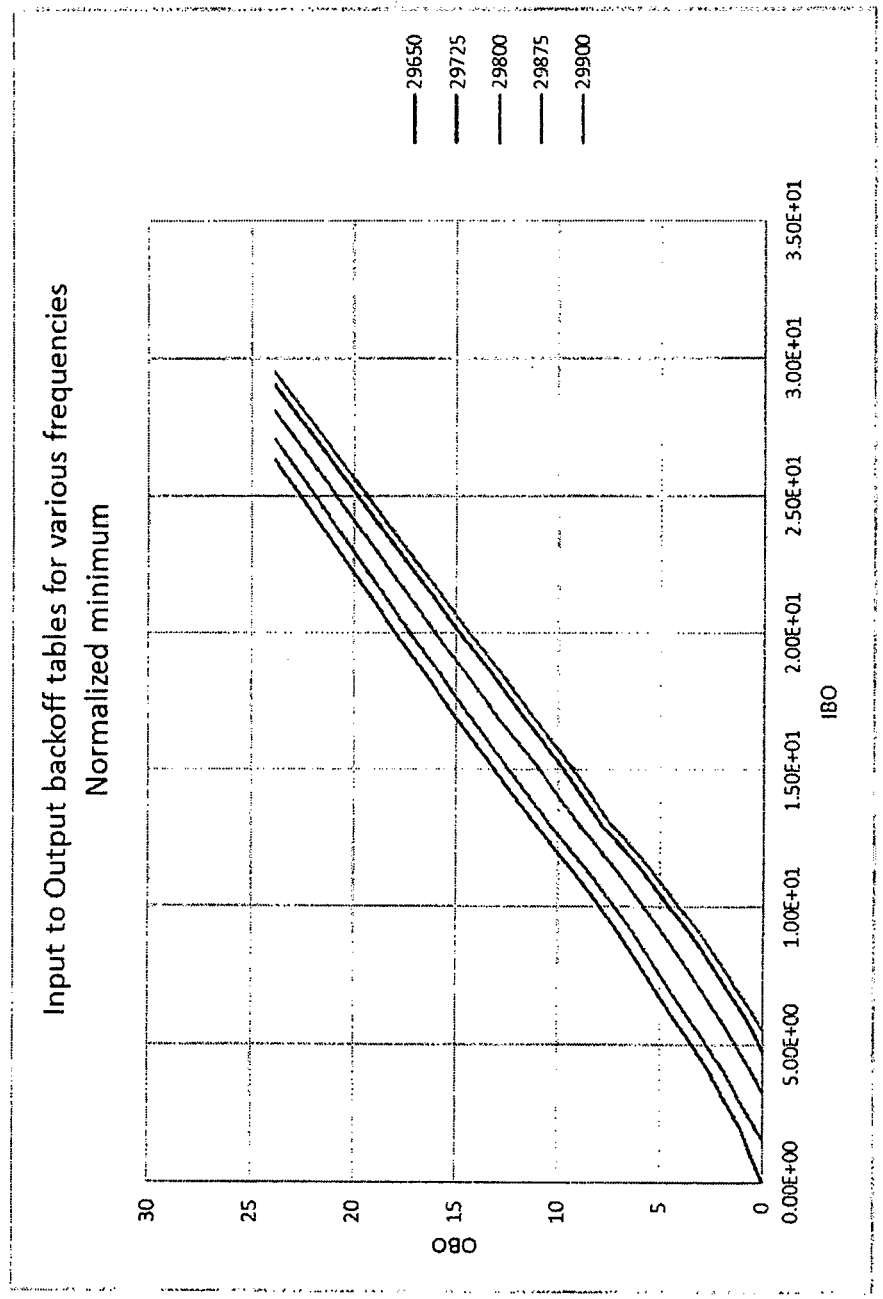
FIG. 4B is a graph illustrating input to output backoff values normalized to a minimum interpolated gain value, according to one embodiment.

FIG. 4B is a graph illustrating input to output backoff values normalized to a minimum interpolated gain value, according to one embodiment. In the graph of FIG. 4B, output backoff (OBO) values are depicted on the Y axis corresponding to input backoff (IBO) values depicted on the X axis, for various transmit frequencies. In this exemplary embodiment, the transmit frequencies include 29625 MHz, 29630 MHz, 29650 MHz, 29675 MHz, 29750 MHz, 29850 MHz, and 29950 MHz, and a line is illustrated for each transmit frequency.

Figure 5A:
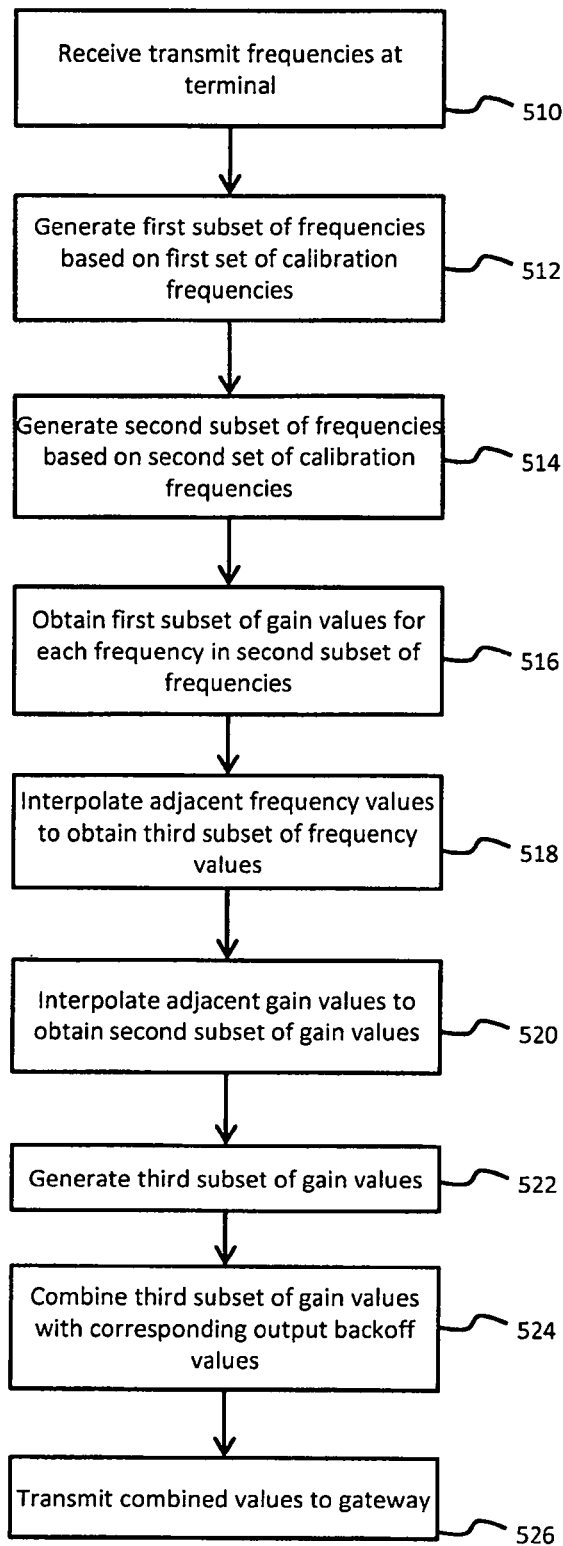
FIG. 5A is a flowchart of a process for determining a normalized transmit power based, in part, on a maximum interpolated gain value, according to one or more embodiments.

FIG. 5A is a flowchart of a process for determining a normalized transmit power, according to one or more embodiments. At 510, a plurality of transmit frequencies are received from a gateway. According to an embodiment, the transmit frequencies can be in the form of center frequencies of various bands for inroutes that can be assigned to terminals within a particular beam. At 512, a first subset of frequencies (hereinafter referred to as S1) is generated based on matching a minimum transmit frequency to the first set of calibration frequencies. For example, a lowest frequency from the received transmit frequencies is matched with a frequency from the first set of calibration frequencies. The matched frequency (from the first set of calibration frequencies) may be greater or lesser in value than the lowest transmit frequency being matched.

According to at least one embodiment, if two calibration frequencies are equally close to the lowest transmit frequency, then the lower frequency of the two calibration frequencies is matched to the lowest transmit frequency. At 512, the highest (i.e. maximum) frequency from the transmit frequencies is also matched with a calibration frequency (from the first set of calibration frequencies). The first subset (S1) then contains both matched calibration frequencies, and all the calibration frequencies from the first set of calibration frequencies that are in between the matched calibration frequencies. At 514, a second subset (S2) of frequencies is generated based on matching the maximum transmit frequency to the second set of calibration frequencies. More particularly, substantially the same operations are performed to generate the first and second subset of frequencies (S1 and S2), with the exception that the minimum and maximum transmit frequencies are used, respectively. Thus, the two subsets (S1) and (S2) contain different numbers of frequencies that are approximately within the same range.

Then at 516, a first subset of gain values (hereinafter referred to as G) associated with each of the second subset of frequencies S2 is obtained from the first set of gain values associated with the second set of calibration frequencies. For example, the calibration data can consist of gain values measured at a default set point for each frequency in the second set of calibration frequencies. Thus, the operation at 516 includes generating a list of gain values corresponding to the frequency values in subset S2. At 518, adjacent frequency values within the second subset of frequencies S2 are interpolated to obtain a third subset of frequencies (hereinafter referred to as S2r). At 520, adjacent gain values within the first subset of gain values are interpolated to obtain a second subset of gain values (hereinafter referred to as Gr). As previously discussed, interpolation can be used to provide a higher resolution by increasing the number of gain values relative to the number of measured gain values.

At 522, a third subset of gain values (hereinafter referred to as Gd) is generated. For example, upon generating the interpolated set of gain values Gr, a maximum gain value of the second subset of gain values Gr can be obtained. The third subset of gain values (hereinafter referred to as Gd) is determined by calculating a difference between the maximum gain value and each gain value of the second subset of gain values Gr. At 524, the third subset of gain values (Gd) is combined with corresponding output backoff values. More particularly, output backoff values corresponding to input backoff values are first identified for each frequency in the third subset of frequencies S2r. Next, a closest matching frequency from the first subset of frequencies S1 is selected for each frequency of the third subset of frequencies S2r. Each gain value of the third subset of gain values Gd is added to a corresponding associated output backoff value, and stored in the terminal in the form of a lookup table or other data structure. According to at least one embodiment, the sum of the output backoff values and the gain values can be used as the normalized transmit power for the terminal. According to other embodiments, additional information can be combined with the sum of output backoff values and gain values in order to obtain the normalized transmit power for the terminal. During operation, the terminal can select the normalized transmit power for an assigned transmit frequency by referring to the lookup table.

As previously discussed, either a minimum or maximum gain value from the second subset of gain values (G2) can be used to calculate the differences when generating the third subset of gain values Gd (from which the lookup table is generated). Using the minimum value (as described in FIGS. 4A-4B) sets the normalized transmit power used equally for all assigned frequencies (based on the lookup table) and helps in not exceeding noise thresholds at the gateway receiving the signal, such as signal-to-noise ratio (SNR) thresholds. On the other hand, using the maximum gain value (as described herein in FIG. 5A) increases the normalized transmit power for each assigned frequency, such that the radio of the terminal transmits at a higher efficiency.

In order to reduce the possibility of exceeding system SNR thresholds when the normalized transmit power is increased, at 526, the lookup table (or at least the combined gain values and associated backoff values) can be transmitted to the gateway. According to various embodiments, the gateway can be configured to determine the appropriate combination of frequency and gain values, and modulation and coding schemes corresponding to these values for assignment to the terminal. For example, the gateway may be configured to correlate the frequency and corresponding gain values from the lookup table with known symbol rates, coding rates, and modulation schemes corresponding to the frequencies, and to identify combinations of symbol rates, coding rates, and modulation schemes that would satisfy a SNR requirement. Therefore, the gateway would only assign frequencies that meet the SNR requirements for certain symbol rates, coding rates, and/or modulation schemes to the terminal, and would not assign frequencies that would trigger SNR thresholds at any symbol rates, coding rates, and/or modulation scheme. According to at least one embodiment, the gateway can be configured to calculate which frequency the terminal can operate at for a given symbol rate and modulation, and assign higher symbol rate or a higher order modulation scheme to the frequencies with higher setpoint gain and the lower symbol rate or a lower order modulation assigned to frequencies with lower setpoint gain (with the higher or lower setpoint gain being based on the calibration data). Further, in the event that the power frequency response information (i.e., gain values corresponding to the second set of frequencies at the default set point) remains generally consistent across terminals within a particular beam, then the gateway may use that information to determine assignment of the higher symbol rates or higher order modulation to correspond with the higher setpoint gain frequencies and correspondingly the lower symbol rates with the lower setpoint gain frequencies.

Figure 5B:
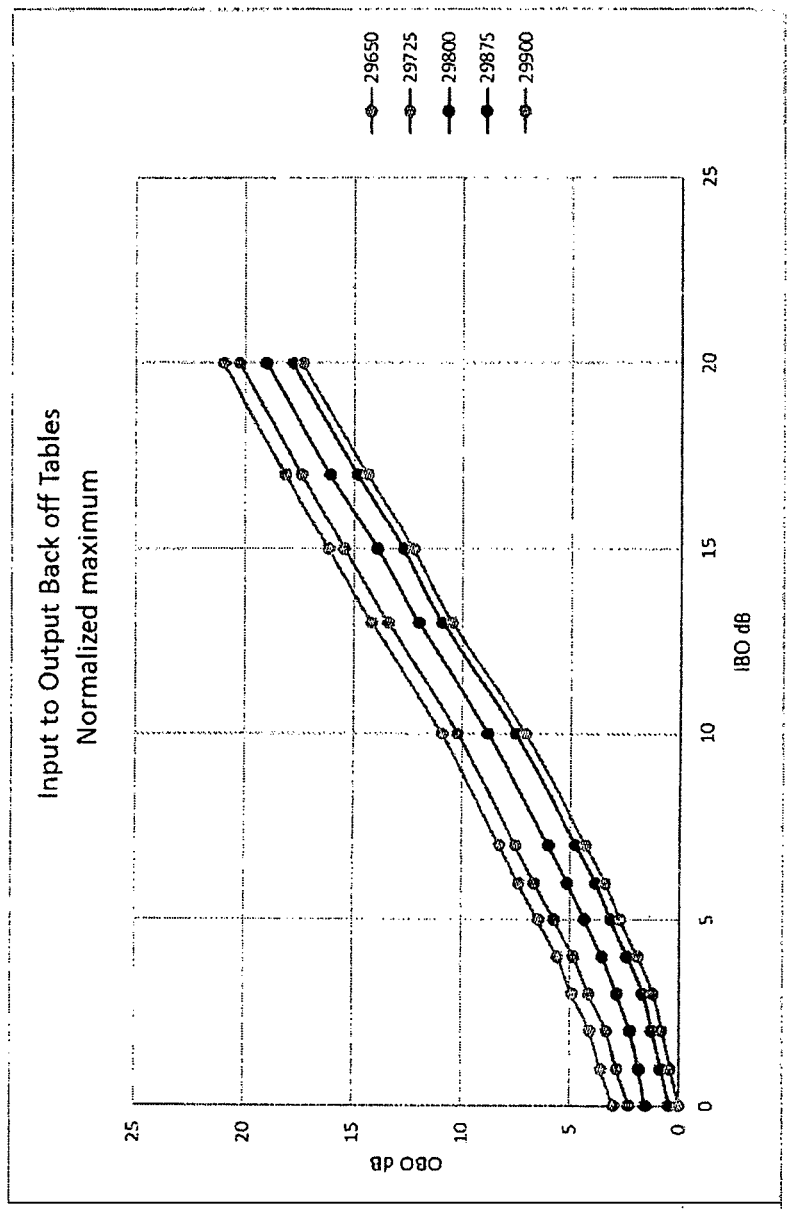
FIG. 5B is a graph illustrating input to output backoff values normalized to a maximum interpolated gain value, according to one embodiment.

FIG. 5B is a graph illustrating input to output backoff values normalized to a maximum interpolated gain value, according to one embodiment. In the graph of FIG. 5B, output backoff (OBO) values are depicted on the Y axis corresponding to input backoff (IBO) values depicted on the X axis, for various transmit frequencies. In this exemplary embodiment, the transmit frequencies include 29650 MHz, 29725 MHz, 29800 MHz, 29875 MHz, and 29900 MHz, and a line is illustrated for each transmit frequency. When comparing graphs in FIG. 4B and FIG. 5B, it is evident that the output backoff values corresponding to the input backoff values are higher in FIG. 5B. This is because the output backoff values are normalized to the maximum interpolated backoff value (as discussed in connection with FIG. 5A) rather than the minimum interpolated backoff value (as discussed in connection with FIG. 4A).

Figure 6:
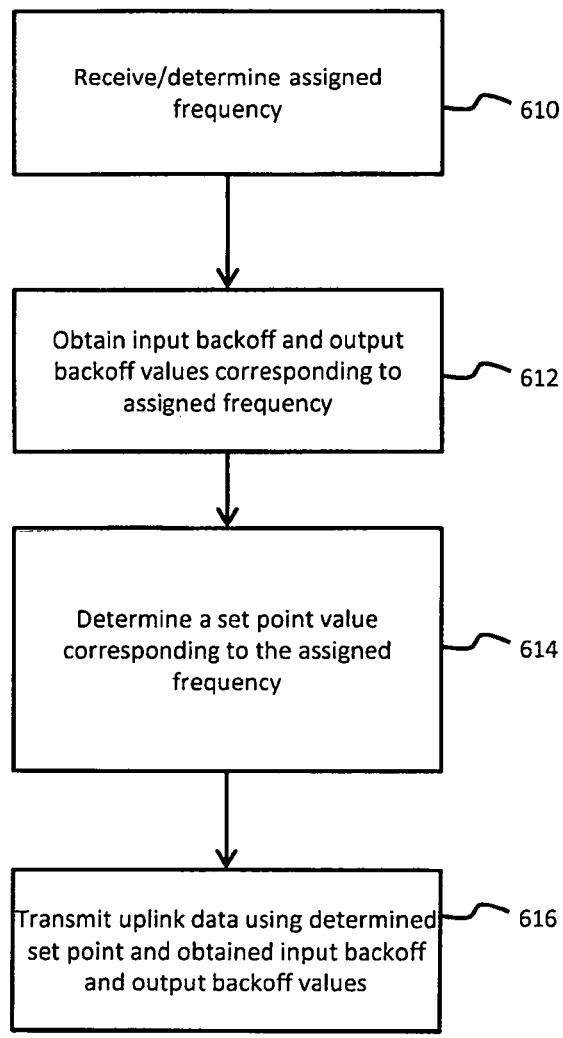
FIG. 6 is a flowchart of a process for looking up different set point gain values for different transmit frequencies, according to one or more embodiments.

FIG. 6 is a flowchart of a process for looking up a set point value based on an assigned frequency, according to one or more embodiments. At 610, an assigned frequency is received or determined at the terminal. The assigned frequency can be any transmit frequency within a predefined frequency range for the terminal. The terminal can be configured to determine the transmit frequency range based on various factors such as its location within the satellite communication network, a type of data being transmitted, etc. The transmit frequency range can include only a portion of the total range of frequencies that the radio can utilize, and be received from the gateway. For example, when the terminal is switched on and registered with the gateway, it is configured to receive a set of potential frequency assignments from the gateway. Thus, the gateway can be configured to assign a set of transmit frequencies to the terminal, subsequent to which the terminal can transmit data to the gateway using one or more of the transmit frequencies (that is, an assigned frequency).

At 612, the terminal selects input backoff and output backoff values corresponding to the assigned frequency from the lookup table. At 614, rather than determine the normalized transmit power based on a default set point as described above, a different set point may be determined for different calibration frequencies. For example, during the calibration procedure, a set point may be determined for another set of frequencies that span the range of the radio in the transceiver. Thus, the calibration data further includes a set point value for the other set of calibration frequencies. The set point value would provide a lowest input backoff value (or a highest power value) that meets a maximum ACI threshold and/or EVM threshold.

According to at least one embodiment, when the normalized transmit power is determined at 612, a selected transmit frequency (as received from, for example, the gateway) can be matched to the first set of calibration frequencies described above, in order to obtain corresponding output backoff values. According to such embodiments, however, the normalized transmit power further would be determined such that it includes matching the selected transmit frequency at 614 to the other set of calibration frequencies to determine a corresponding set point value. The uplink data can subsequently be transmitted to the gateway using a determined set point value and obtained output backoff values for each subsequent transmission at 616. More particularly, for each assigned transmit frequency, the corresponding set point value is set prior to transmission of data using that assigned frequency. Thus, the lookup table in this embodiment includes the output backoff values corresponding to various input backoff values for a first set of frequencies, as well as the set points for another (e.g. second) set of frequencies. Table 3 below shoes exemplary frequency values and set points corresponding thereto.

TABLE 3

| Frequency (MHz) | Set Point (V) |
|---|---|
| 29250 | 1.653 |
| 29325 | 1.698 |
| 29400 | 1.752 |
| 29475 | 1.785 |
| 29550 | 1.738 |
| 29625 | 1.653 |
| 29700 | 1.568 |
| 29775 | 1.556 |
| 29850 | 1.635 |
| 29925 | 1.645 |
| 30000 | 1.634 |

Various features described herein may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. For example, such hardware/software/firmware combinations can be incorporated into, or used to implement, the previously described receivers, transmitters, transceivers, gateway, network management system, modulator/demodulator, etc. Additionally, such hardware can be interfaced to connect and/or facilitate communication between different components such as the automobile infotainment system and receiver. Furthermore, various features can be implemented using algorithms illustrated in the form of flowcharts and accompanying descriptions. Some or all steps associated with such flowcharts can be performed in a sequence independent manner, unless otherwise indicated.

The terms software, computer software, computer program, program code, and application program may be used interchangeably and are generally intended to include any sequence of machine or human recognizable instructions intended to program/configure a computer, processor, server, etc. to perform one or more functions. Such software can be rendered in any appropriate programming language or environment including, without limitation: C, C++, C #, Python, R, Fortran, COBOL, assembly language, markup languages (e.g., HTML, SGML, XML, VoXML), Java, JavaScript, etc. As used herein, the terms processor, microprocessor, digital processor, and CPU are meant generally to include all types of processing devices including, without limitation, single/multi-core microprocessors, digital signal processors (DSPs), reduced instruction set computers (RISC), general-purpose (CISC) processors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components. Such exemplary hardware for implementing the described features are detailed below.

Figure 7:
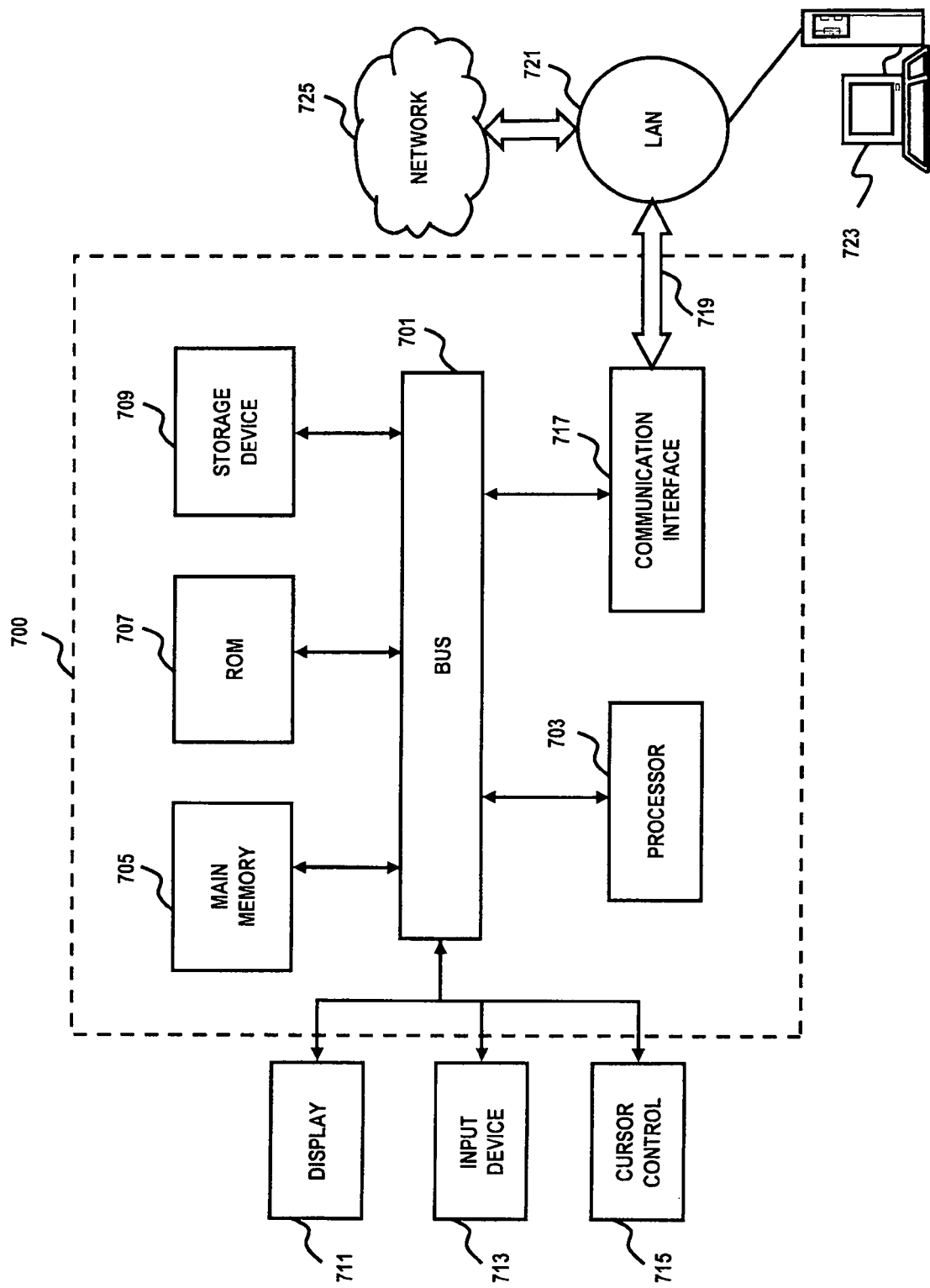
FIG. 7 is a diagram of a computer system that can be used to implement various exemplary features and embodiments.

FIG. 7 is a diagram of a computer system that can be used to implement features of various embodiments. The computer system 700 includes a bus 701 or other communication mechanism for communicating information and a processor 703 coupled to the bus 701 for processing information. The computer system 700 also includes main memory 705, such as a random access memory (RAM), dynamic random access memory (DRAM), synchronous dynamic random access memory (SDRAM), double data rate synchronous dynamic random-access memory (DDR SDRAM), DDR2 SDRAM, DDR3 SDRAM, DDR4 SDRAM, etc., or other dynamic storage device (e.g., flash RAM), coupled to the bus 701 for storing information and instructions to be executed by the processor 703. Main memory 705 can also be used for storing temporary variables or other intermediate information during execution of instructions by the processor 703. The computer system 700 may further include a read only memory (ROM) 707 or other static storage device coupled to the bus 701 for storing static information and instructions for the processor 703. A storage device 709, such as a magnetic disk or optical disk, is coupled to the bus 701 for persistently storing information and instructions.

The computer system 700 may be coupled via the bus 701 to a display 711, such as a light emitting diode (LED) or other flat panel displays, for displaying information to a computer user. An input device 713, such as a keyboard including alphanumeric and other keys, is coupled to the bus 701 for communicating information and command selections to the processor 703. Another type of user input device is a cursor control 715, such as a mouse, a trackball, or cursor direction keys, for communicating direction information and command selections to the processor 703 and for controlling cursor movement on the display 711. Additionally, the display 711 can be touch enabled (i.e., capacitive or resistive) in order facilitate user input via touch or gestures.

According to an exemplary embodiment, the processes described herein are performed by the computer system 700, in response to the processor 703 executing an arrangement of instructions contained in main memory 705. Such instructions can be read into main memory 705 from another computer-readable medium, such as the storage device 709. Execution of the arrangement of instructions contained in main memory 705 causes the processor 703 to perform the process steps described herein. One or more processors in a multiprocessing arrangement may also be employed to execute the instructions contained in main memory 705. In alternative embodiments, hard-wired circuitry may be used in place of or in combination with software instructions to implement exemplary embodiments. Thus, exemplary embodiments are not limited to any specific combination of hardware circuitry and software.

The computer system 700 also includes a communication interface 717 coupled to bus 701. The communication interface 717 provides a two-way data communication coupling to a network link 719 connected to a local network 721. For example, the communication interface 717 may be a digital subscriber line (DSL) card or modem, an integrated services digital network (ISDN) card, a cable modem, fiber optic service (FiOS) line, or any other communication interface to provide a data communication connection to a corresponding type of communication line. As another example, communication interface 717 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 717 sends and receives electrical, electromagnetic, or optical signals that carry digital data streams representing various types of information. Further, the communication interface 717 can include peripheral interface devices, such as a Universal Serial Bus (USB) interface, a High Definition Multimedia Interface (HDMI), etc. Although a single communication interface 717 is depicted in FIG. 7, multiple communication interfaces can also be employed.

The network link 719 typically provides data communication through one or more networks to other data devices. For example, the network link 719 may provide a connection through local network 721 to a host computer 723, which has connectivity to a network 725 such as a wide area network (WAN) or the Internet. The local network 721 and the network 725 both use electrical, electromagnetic, or optical signals to convey information and instructions. The signals through the various networks and the signals on the network link 719 and through the communication interface 717, which communicate digital data with the computer system 700, are exemplary forms of carrier waves bearing the information and instructions.

The computer system 700 can send messages and receive data, including program code, through the network(s), the network link 719, and the communication interface 717. In the Internet example, a server (not shown) might transmit requested code belonging to an application program for implementing an exemplary embodiment through the network 725, the local network 721 and the communication interface 717. The processor 703 may execute the transmitted code while being received and/or store the code in the storage device 709, or other non-volatile storage for later execution. In this manner, the computer system 700 may obtain application code in the form of a carrier wave.

The term "computer-readable medium" as used herein refers to any medium that participates in providing instructions to the processor 703 for execution. Such a medium may take many forms, including but not limited to non-volatile media, volatile media, and transmission media. Non-volatile media include, for example, optical or magnetic disks, such as the storage device 709. Non-volatile media can further include flash drives, USB drives, microSD cards, etc. Volatile media include dynamic memory, such as main memory 705. Transmission media include coaxial cables, copper wire and fiber optics, including the wires that comprise the bus 701. Transmission media can also take the form of acoustic, optical, or electromagnetic waves, such as those generated during radio frequency (RF) and infrared (IR) data communications. Common forms of computer-readable media include, for example, a USB drive, microSD card, hard disk drive, solid state drive, optical disk (e.g., DVD, DVD RW, Blu-ray), or any other medium from which a computer can read.

Figure 8:
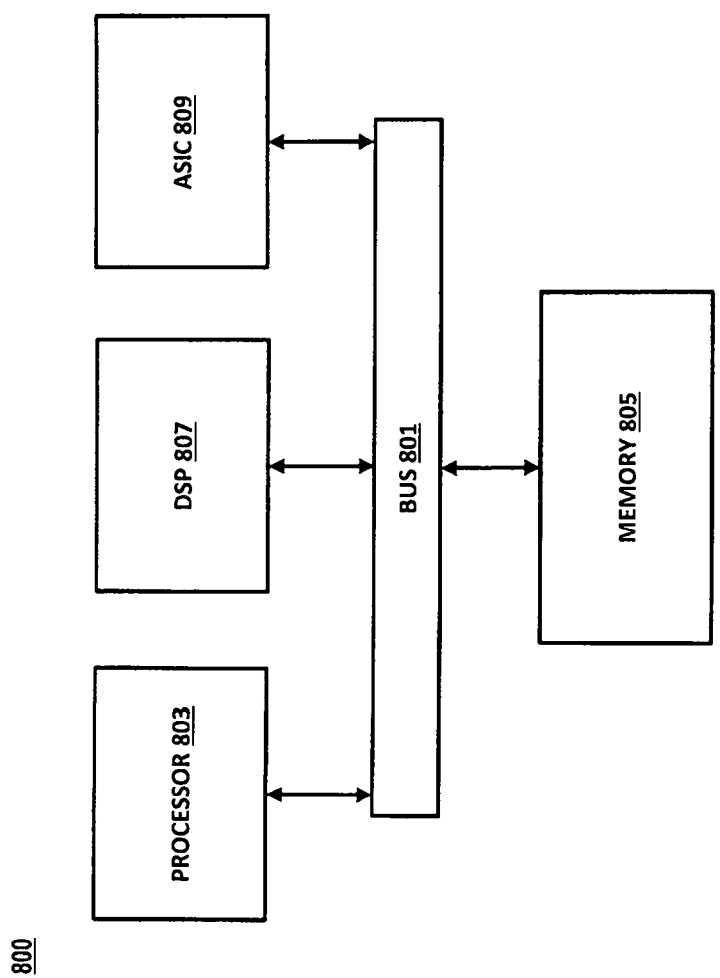
FIG. 8 is a diagram of a chip set that can be used to implement various exemplary features and embodiments.

FIG. 8 illustrates a chip set 800 upon which features of various embodiments may be implemented. Chip set 800 is programmed to implement various features as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 800, or a portion thereof, constitutes a means for performing one or more steps of the figures.

In one embodiment, the chip set 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 803 and accompanying components have connectivity to the memory 805 via the bus 801. The memory 805 includes both dynamic memory (e.g., RAM, magnetic disk, re-writable optical disk, etc.) and static memory (e.g., ROM, CD-ROM, DVD, BLU-RAY disk, etc.) for storing executable instructions that when executed perform the inventive steps described herein. The memory 805 also stores the data associated with or generated by the execution of the inventive steps.

While certain exemplary embodiments and implementations have been described herein, other embodiments and modifications will be apparent from this description. Various features are illustrated and described with particular embodiments only for exemplary purposes. Such features are not limited to the figures and/or embodiments used to describe such features. Furthermore, such features can be incorporated into other features described with reference to different figures. Accordingly, the various features and embodiments described are not intended to be limiting, but rather are encompassed by the broader scope of the presented claims and various obvious modifications and equivalent arrangements.

What is claimed is:

1. A method for determining a normalized transmit power for a terminal of a wireless communications network, wherein calibration data stored in the terminal comprises a first set of calibration frequencies, a first set of input backoff values each corresponding to a respective frequency of the first set of calibration frequencies, a first set of output backoff values each corresponding to a respective input backoff value of the first set of input backoff values, a second set of calibration frequencies, and a first set of gain values each corresponding to a respective frequency of the second set of calibration frequencies, the method comprising:

generating a first subset S1 of frequencies from the first set of calibration frequencies, based on matching a minimum transmit frequency to the first set of calibration frequencies and matching a maximum transmit frequency to the first set of calibration frequencies;

generating a second subset S2 of frequencies from the second set of calibration frequencies based on matching the minimum transmit frequency to the second set of calibration frequencies and matching the maximum transmit frequency to the second set of calibration frequencies;

generating a first subset G of gain values from the first set of gain values, wherein the first subset G comprises each gain value of the first set which corresponds with a one of the calibration frequencies of the second subset S2;

generating a third subset S2r of frequencies by interpolating adjacent frequencies of the second subset S2;

generating a second subset Gr of gain values by interpolating adjacent gain values of the first subset G;

determining a normalized transmit power for each of the frequencies of the third subset S2r based, at least in part, on the second subset Gr and a corresponding output backoff value;

receiving an assigned frequency for communications by the terminal to a gateway of the wireless communications network;

selecting a first one of the normalized transmit powers corresponding to the assigned frequency; and transmitting uplink data to the gateway using the selected first normalized transmit power.

2. The method of claim 1, wherein the assigned frequency is received by the terminal from one or more of the gateway and a network management system of the wireless communications network.

3. The method of claim 1, further comprising:

receiving, by the terminal, a second assigned frequency for further communications from the terminal to the gateway;

selecting a second one of the normalized transmit powers corresponding to the second assigned frequency; and transmitting further uplink data to the gateway using the selected second normalized transmit power.

4. The method of claim 1, wherein:

the first set of gain values calibration data further comprises a transmit power set point for each frequency of the second set of calibration frequencies with a radio of the terminal configured at a default set point; and the default set point corresponds to a lowest input backoff value that meets one or more of an error vector measure and a maximum adjacent channel interference threshold.

5. The method of claim 4, wherein determining the normalized transmit power comprises:

matching a selected transmit frequency with the first set of calibration frequencies to determine a corresponding output backoff value; and matching the selected transmit frequency with the second set of calibration frequencies to determine a corresponding set point value, wherein the uplink data is transmitted using the corresponding output backoff value and the corresponding set point.

6. The method of claim 1, wherein the first set of gain values is based on a default set point corresponding to a lowest input backoff value that meets one or more of an error vector measure and a maximum adjacent channel interference threshold.

7. The method of claim 6, wherein the output backoff values are based, at least in part, on the default set point.

8. The method of claim 1, wherein:

the subset S1 comprises a minimum calibration frequency and a maximum calibration frequency from the first set of calibration frequencies, and all calibration frequencies of the first set that are between the minimum and maximum calibration frequencies; and the subset S2 comprises a minimum calibration frequency and a maximum calibration frequency from the second set of calibration frequencies, and all calibration frequencies of the second set that are between the minimum and maximum calibration frequencies.

9. The method of claim 8, wherein:

the minimum calibration frequency of the subset S1 is determined as a frequency of the first set of calibration frequencies that is closest to a minimum frequency of a plurality of transmit frequencies received from the gateway, and the maximum calibration frequency of the subset S1 is determined as a frequency of the first set of calibration frequencies that is closest to a maximum frequency of the plurality of transmit frequencies received from the gateway; and the minimum calibration frequency of the subset S2 is determined as a frequency of the second set of calibration frequencies that is closest to the minimum frequency of the plurality of transmit frequencies received from the gateway, and the maximum calibration frequency of the subset S2 is determined as a frequency of the second set of calibration frequencies that is closest to the maximum frequency of the plurality of transmit frequencies received from the gateway.

10. The method of claim 1, further comprising:

generating a third subset Gd of gain values with each being a difference between a minimum gain value of the subset Gr and a respective other gain value of the subset Gr; and wherein the normalized transmit power for each of the frequencies of the third subset S2r is determined based on a corresponding gain value of the third subset Gd and a corresponding output backoff value.

11. The method of claim 10, wherein:

the subset S1 comprises a minimum calibration frequency and a maximum calibration frequency from the first set of calibration frequencies, and all calibration frequencies of the first set that are between the minimum and maximum calibration frequencies; and the subset S2 comprises a minimum calibration frequency and a maximum calibration frequency from the second set of calibration frequencies, and all calibration frequencies of the second set that are between the minimum and maximum calibration frequencies.

12. The method of claim 11, wherein:

the minimum calibration frequency of the subset S1 is determined as a frequency of the first set of calibration frequencies that is closest to a minimum frequency of a plurality of transmit frequencies received from the gateway, and the maximum calibration frequency of the subset S1 is determined as a frequency of the first set of calibration frequencies that is closest to a maximum frequency of the plurality of transmit frequencies received from the gateway; and the minimum calibration frequency of the subset S2 is determined as a frequency of the second set of calibration frequencies that is closest to the minimum frequency of the plurality of transmit frequencies received from the gateway, and the maximum calibration frequency of the subset S2 is determined as a frequency of the second set of calibration frequencies that is closest to the maximum frequency of the plurality of transmit frequencies received from the gateway.

13. The method of claim 1, further comprising:
generating a third subset Gd of gain values with each being a difference between a maximum gain value of the subset Gr and a respective other gain value of the subset Gr; and
wherein the normalized transmit power for each of the frequencies of the third subset S2r is determined based on a corresponding gain value of the third subset Gd and a corresponding output backoff value.

14. The method of claim 13, wherein:
the subset S1 comprises a minimum calibration frequency and a maximum calibration frequency from the first set of calibration frequencies, and all calibration frequencies of the first set that are between the minimum and maximum calibration frequencies; and
the subset S2 comprises a minimum calibration frequency and a maximum calibration frequency from the second set of calibration frequencies, and all calibration frequencies of the second set that are between the minimum and maximum calibration frequencies.

15. The method of claim 14, wherein:
the minimum calibration frequency of the subset S1 is determined as a frequency of the first set of calibration frequencies that is closest to a minimum frequency of a plurality of transmit frequencies received from the gateway, and the maximum calibration frequency of the subset S1 is determined as a frequency of the first set of calibration frequencies that is closest to a maximum frequency of the plurality of transmit frequencies received from the gateway; and
the minimum calibration frequency of the subset S2 is determined as a frequency of the second set of calibration frequencies that is closest to the minimum frequency of the plurality of transmit frequencies received from the gateway, and the maximum calibration frequency of the subset S2 is determined as a frequency of the second set of calibration frequencies that is closest to the maximum frequency of the plurality of transmit frequencies received from the gateway.

16. A method comprising:
obtaining calibration data for a terminal during a calibration procedure, wherein the calibration data comprises output backoff values corresponding to input backoff values for each of a first set of calibration frequencies, and a first set of gain values associated with each of a second set of calibration frequencies;
generating a first subset S1 of frequencies based on matching a minimum transmit frequency to the first set of calibration frequencies and matching a maximum transmit frequency to the first set of calibration frequencies;
generating a second subset S2 of frequencies based on matching the minimum transmit frequency to the second set of calibration frequencies and matching the maximum transmit frequency to the second set of calibration frequencies;
obtaining, from the first set of gain values, a first subset G of gain values associated with the second subset S2;
interpolating adjacent frequencies of the second subset S2 to obtain a third subset S2r of frequencies;
interpolating adjacent gain values of the first subset G to obtain a second subset Gr of gain values;
determining a normalized transmit power for each of the frequencies of the third subset S2r based on the second subset Gr and a corresponding output backoff value;
receiving an assigned frequency for communicating with a gateway in a satellite communication system; and
transmitting uplink data to the gateway using a selected normalized transmit power corresponding to the assigned frequency.

17. The method of claim 16, wherein the first set of gain values is obtained for a default set point corresponding to a lowest input backoff value that meets a maximum adjacent channel interference (ACI) threshold.

18. The method of claim 17, wherein the output backoff values corresponding to the input backoff values are based, at least in part, on the default set point.

19. The method of claim 16, further comprising:
selecting a minimum gain value from the second subset Gr;
generating a third subset Gd of gain values by calculating a difference between the minimum gain value and each gain value of the second subset Gr;
identifying input backoff values and corresponding output backoff values for each frequency of the third subset S2r;
determining, for each frequency in the third subset S2r, a closest matching frequency from the first subset S1; and
combining each gain value of the third subset Gd with its associated output backoff value,
wherein the normalized transmit power is selected based, at least in part, on the combined gain value and associated backoff value.

20. The method of claim 16, further comprising:
selecting a maximum gain value from the second subset Gr;
generating a third subset Gd of gain values by calculating a difference between the maximum gain value and each gain value of the second subset Gr;
identifying input backoff values and corresponding output backoff values for each frequency of the third subset S2r;
determining, for each frequency in the third subset S2r, a closest matching frequency from the first subset S1;
combining each gain value of the third subset Gd with its associated output backoff value;
transmitting the combined gain values and associated output backoff values to the gateway; and
receiving, from the gateway, at least one of symbol rates, coding rates, modulation schemes, and assigned frequencies, wherein the symbol rates, coding rates, modulation schemes, and assigned frequencies are based, at least in part, on the combined gain values and associated output backoff values, and the normalized transmit power is selected based, at least in part, on the combined gain value and associated backoff value.

* * * * *